(12) United States Patent
Austin et al.

(10) Patent No.: US 7,787,981 B2
(45) Date of Patent: Aug. 31, 2010

(54) SYSTEM FOR RELIABLE COLLABORATIVE ASSEMBLY AND MAINTENANCE OF COMPLEX SYSTEMS

(75) Inventors: Paul R. Austin, Webster, NY (US); Gregory F. Weselak, Rochester, NY (US); Scott David Weber, Canandaigua, NY (US)

(73) Assignee: Xerox Corporation, Norwalk, CT (US)

( * ) Notice: Subject to any disclaimer, the term of this patent is extended or adjusted under 35 U.S.C. 154(b) by 155 days.

(21) Appl. No.: 12/122,199

(22) Filed: May 16, 2008

(65) Prior Publication Data

US 2009/0138116 A1 May 28, 2009

(51) Int. Cl.
G06F 19/00 (2006.01)
G01C 17/38 (2006.01)
(52) U.S. Cl. .......................... 700/168; 702/95
(58) Field of Classification Search ............... 700/168; 702/95
See application file for complete search history.

(56) References Cited

U.S. PATENT DOCUMENTS

| | | | |
|---|---|---|---|
| 6,470,240 B1 | 10/2002 | Haynes et al. | |
| 6,553,321 B2 * | 4/2003 | Siegel et al. | 702/33 |
| 6,571,179 B2 | 5/2003 | Siegel | |
| 6,845,279 B1 * | 1/2005 | Gilmore et al. | 700/115 |
| 7,613,590 B2 * | 11/2009 | Brown | 702/188 |
| 2003/0121677 A1 * | 7/2003 | Watanabe et al. | 173/2 |
| 2006/0155582 A1 * | 7/2006 | Brown | 705/3 |
| 2007/0084613 A1 | 4/2007 | Zhang et al. | |
| 2007/0120663 A1 * | 5/2007 | Roewer | 340/539.22 |

OTHER PUBLICATIONS

Leap Digital, "Machine-to-Machine Telemetry Systems", Published: Oct. 5, 2006.*
Lukowicz, Paul, et al: "WearIT@Work: Toward Real-World Industrial Wearable Computing", IEEE Pervasive Computing, vol. 6, No. 4, 2007, pp. 8-13.
Austin, Paul R.: Invention Disclosure, "System for reliable collaborative assembly and maintenance of aircraft and other complex systems".
Weselak, Gregory F.: Invention Disclosure, "Position-Aware ESD Test Gun", signed Mar. 24, 2006.
Austin, Paul R. et al.: TAP Comments, ID20071479.

* cited by examiner

*Primary Examiner*—Ryan A Jarrett
(74) *Attorney, Agent, or Firm*—Hoffmann & Baron, LLP

(57) ABSTRACT

A system and method of tracking location and orientation of power tools utilized in the assembly and maintenance of complex systems is disclosed. The system can facilitate collaboration between maintenance and alert maintenance personnel to complete complex system activities.

11 Claims, 4 Drawing Sheets

SYSTEM FOR RELIABLE COLLABORATIVE ASSEMBLY AND MAINTENANCE OF COMPLEX SYSTEMS

TECHNICAL FIELD

The disclosure generally relates to complex systems, and more particularly to collaborative assembly and maintenance of complex systems using a power tool.

BACKGROUND

Complex systems are composed of interconnected parts that as a whole exhibit one or more properties or behavior not obvious from the properties of the individual parts. For example, aircraft are complex systems with many parts and critical dependencies that require proper maintenance. Mechanical parts workers perform various tasks involving the disassembly, inspection, repair, assembly, and maintenance of mechanical parts of aircraft components according to detailed maintenance and repair procedures. The work typically includes visual and dimensional examination of parts and complex components such as wings, fuel valves, rotor blades, compressor blades, and oil pumps for obvious defects such as nicks, scratches, leaks, or corrosion, or for worn, bent, or broken parts; replacing or reworking damaged parts; and performing tests for operability of moving parts. Failure of examination can lead to significant damage and loss of life.

As there are many similar complex systems with critical safety requirements, there exists a need for a collaborative assembly and maintenance system that can track mechanical work precisely while being economically cost effective.

SUMMARY

A system and method of tracking location and orientation of power tools utilized in the assembly and maintenance of complex systems is disclosed. The system can facilitate collaboration between maintenance and alert maintenance personnel to complete complex system activities.

Various aspects of the system relate to identifying a next operation location for the power tool and monitoring performance of the tool during pre-defined tasks.

For example, according to one aspect, a system for collaborative assembly and maintenance of complex systems includes a network, a power tool operatively coupled to the network, the power tool comprising a sensor to sense operational characteristics associated with the tool and a job task, the operational characteristics including location and performance information, and a computer operatively coupled to the network, the computer arranged to receive the operational characteristics and to provide a next operation location for the power tool.

In one embodiment, the sensor of the system is at least one of a single axis accelerometer, a multiple axis accelerometer, an analog accelerometer, a digital accelerometer, a rotational speed sensor, an angular speed sensor, and a laser ring gyroscope.

Typically the network is a wireless network. Example networks that can be used with the system include a 802.11-compliant network, Bluetooth network, cellular digital packet data (CDPD) network, high speed circuit switched data (HSCSD) network, packet data cellular (PDC-P) network, general packet radio service (GPRS) network, 1x radio transmission technology (1xRTT) network, IrDA network, multichannel multipoint distribution service (MMDS) network, local multipoint distribution service (LMDS) network, and worldwide interoperability for microwave access (WiMAX) network.

In one embodiment, the power tool is a fastener, such as a power screw driver. In another embodiment, the power tool is an electrostatic discharge (ESD) simulator. Advantageously, the power tool includes a display to display the instructions. For example, the instructions can include location information for positioning the tool.

The computer of the system includes a display device to display a job status associated with the tool and stores the job status in a task status data store. The computer also can provide instructions to control the power tool by accessing a task design data store. In one embodiment, the computer provides the instructions on a display of the power tool. In another embodiment, the instructions are provided on a heads-up display. In yet another embodiment, the instructions are provided on a wristwatch-type display worn by a user of the power tool.

In another aspect, a power tool for use with a complex system includes a sensor to sense operational characteristics associated with the tool being applied to a task, the operational characteristics comprising at least one of tool location and tool performance, and a display arranged to provide an operational instruction for the tool in response to the operational characteristics.

In one embodiment, the power tool also includes a communication port to receive the operational instruction from a computer and to send the operational characteristics to the computer on completion of the task. The communication port is at least one of a serial port, USB port, and a wireless transmitter/receiver port.

In yet another aspect, a method of providing reliable assembly and maintenance of complex systems includes sensing an operational characteristic associated with operation of a power tool, the operational characteristics comprising location and performance information associated with use of the tool, and tracking use of the power tool based on the operational characteristic.

The method can include transmitting an instruction to the power tool based on the operational characteristic, the instruction comprising a next operation for the tool. The sensing of the operational characteristic can include utilizing an accelerometer. The method can also include transmitting the operational characteristic wirelessly.

In one embodiment, the method of controlling use of the tool includes generating an instruction for operation of the power tool, and displaying the instruction on a display unit of the power tool. The method also can include tracking a location coordinate associated with the power tool. In yet another embodiment, the method can include comparing the operational characteristic to a threshold value, and controlling the power tool based on the comparison.

Several benefits can be derived from the present system and techniques. For example, the system can improve reliability of complex systems by monitoring completion of maintenance. The system can also facilitate coordination of various workers by keeping track of work completed and remaining. The system and techniques can also provide repair records for risk assessment/accident analysis as well as identify overlooked repair operations.

In addition, the system and techniques provide a portable user interface and can set tool performance characteristics that can reduce mistakes leading to further damage, reduce training requirements of workers, as well as accelerate repair times to complex systems by eliminating wasted tool movement.

For example, in the context of a vehicular rescue operation, the power tool of the system can be utilized to exploit design knowledge of a vehicle to assist rescuers in safely dismantling the vehicle to extricate victims of the accident.

Advantageously, the system can support multiple power tools and can interact with multiple systems. For example, in an assembly line context, a product under assembly can be temporarily configured with a sensor. The system can then track location information of the product and calculate relative positions for operations on the product.

Additional features and advantages will be readily apparent from the following detailed description, the accompanying drawings and the claims. It is to be understood, however, that the drawings are designed as an illustration only and not as a definition of the limits of the disclosure.

BRIEF DESCRIPTION OF THE DRAWINGS

Like reference symbols in the various drawings indicate like elements.

DETAILED DESCRIPTION

Figure 1:
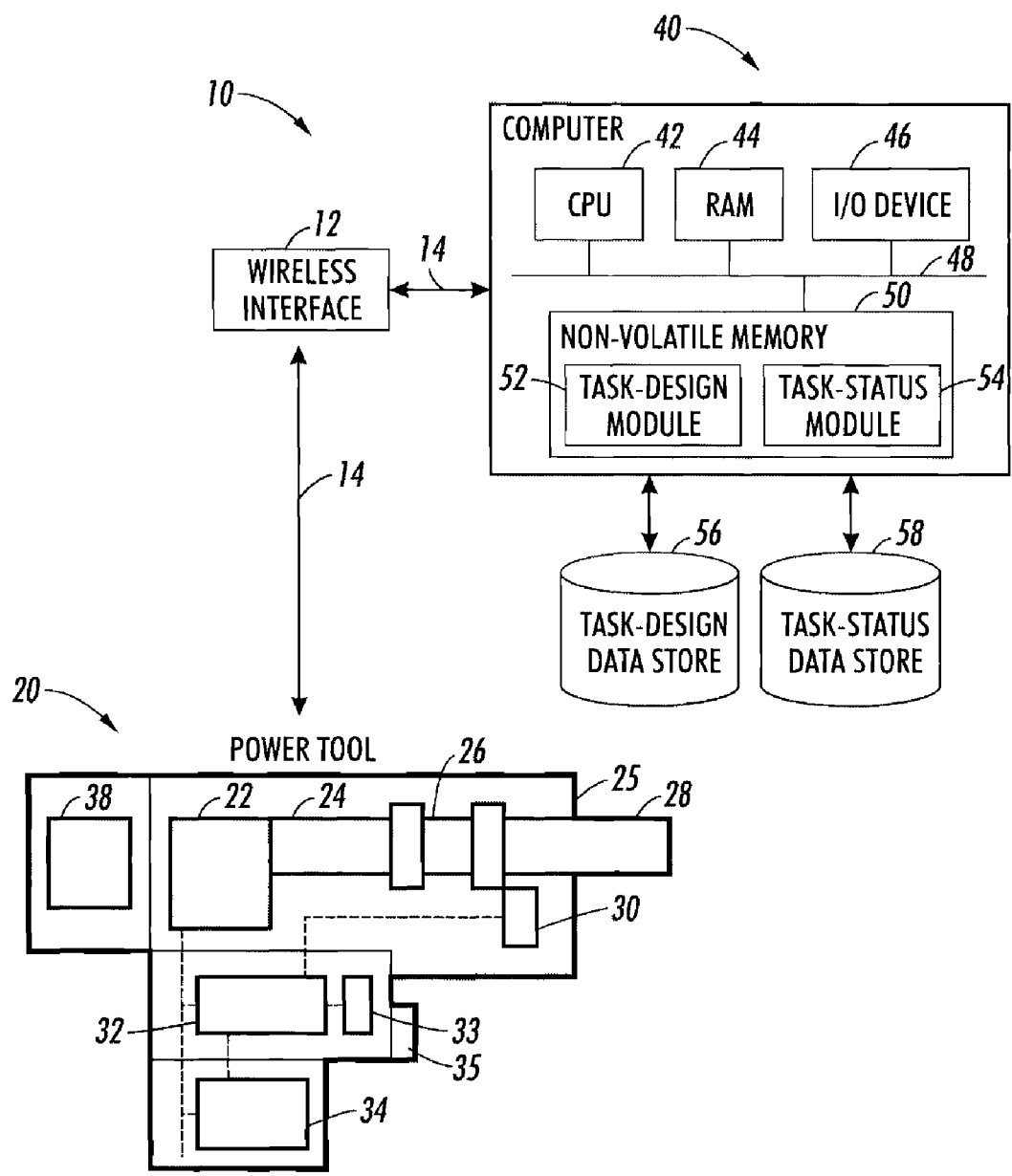
FIG. 1 illustrates a block diagram of a system for collaborative assembly and maintenance of complex systems.

Referring now to FIG. 1, an example system 10 for tracking location and orientation of a power tool 20 that can be utilized in the assembly and maintenance of a complex system is disclosed.

As used herein, the phrase "power tool" refers to any electrical or battery operated drill, hammer, screw driver, fastener device that joins or affixes two or more objects together, static electricity discharge devices, such as electro-static discharge (ESD) simulators, and pneumatic and hydraulic tools, such as an impact wench and hydraulic jack, respectively.

As used herein, the phrase "complex system" refers to a plurality of interconnected parts that as a whole exhibit one or more properties not obvious from the properties of the individual parts. For example, aircraft are considered a complex system as aircraft are capable of sustained air travel and include various parts, such as flaps, wing tips, strut and attach fittings, engines, ribs, etc.

As used herein, the phrase "operational characteristics" refers to tool location, orientation and performance information associated with use of a power tool.

As used herein, the phrase "an operation instruction" refers to a step in a pre-defined system procedure. The system procedure can include either an assembly or repair procedure.

As used herein, the term "sensor" refers to a single axis accelerometer, a multiple axis accelerometer, an analog accelerometer, a digital accelerometer, a rotational speed sensor, an angular speed sensor, and/or a laser ring gyroscope.

As used herein, the term "computer" refers to an electronic, digital machine that responds to a specific set of instructions in a well-defined manner and can execute a prerecorded list of instructions.

As used herein, the term "network" refers to one or more communication paths linking electronic devices.

As used herein, the phrase "operatively coupled" refers to a wired or wireless connection.

As used herein, the phrase "head-up display" refers to any display device that presents data without obscuring the user's view.

As shown in the FIG. 1 example, the system 10 includes a wireless network 14, at least one power tool 20 operatively coupled to the wireless network 14 through a wireless access point router 12, and a computer 40 operatively coupled to the network 14 and in communication with the power tool 20. The computer 40 is configured to receive operational characteristics of the power tool 20 and to provide a next location for the power tool 20 to be utilized in accomplishing a job task. Although only one power tool 20 is shown in FIG. 1, the present disclosure is not limited to one power tool and can include a multitude of varied power tools that are capable of communicating using wired or wireless protocols.

The computer 40 is an electronic device that includes a central processor unit (CPU) 42, random access memory (RAM) 44, an input-output control module 46, and non-volatile memory 50, all of which are interconnected via a bus line 48 and controlled by the CPU 42. In one exemplary embodiment, the non-volatile memory 50 of the device 40 is configured to include a task-design module 52 and task-status module 54 that operate to send and receive messages over the network 14 to the power tool 20. Details of the task-design module 52 and task-status module 54 are discussed below.

The task-design data store 56 and task-status data store 58 provide storage for one or more data items representative of a complex system task. In one embodiment, the data stores 56, 58 are relational databases. In another embodiment, the data stores 56, 58 are established on a directory server, such as a Lightweight Directory Access Protocol (LDAP) server. In other embodiments, the data stores 56, 58 are a configured area in memory 50 of the computer 40.

The wireless network 14 can include an 802.11-compliant network, Bluetooth network, cellular digital packet data (CDPD) network, high speed circuit switched data (HSCSD) network, packet data cellular (PDC-P) network, general packet radio service (GPRS) network, 1x radio transmission technology (1xRTT) network, IrDA network, multichannel multipoint distribution service (MMDS) network, local multipoint distribution service (LMDS) network, worldwide interoperability for microwave access (WiMAX) network, and/or any other network that communicates using a wireless protocol.

As shown in FIG. 1, the power tool 20 can be a hand held rotary driver. While the following description is provided with reference to a rotary driver, it is readily understood that the broader aspects of this disclosure are applicable to other types of power tools, including drills, static electricity discharge devices, such as electro-static discharge (ESD) simulators, hammers, as well as pneumatic and hydraulic tools, such as an impact wench and hydraulic jack, respectively.

For example, in one exemplary embodiment, the power tool 20 includes a spindle 28 (i.e., a rotary shaft) drivably coupled to an electric motor 22. A drive shaft 24 of the motor 22 is connected via a gear 26 to the other end of the spindle 28. These components are enclosed within a housing 25 of the tool 20. Operation of the tool 20 is controlled through the use an operator actuated switch 35 included in the handle of the tool that regulates current flow from a power supply 34 to the motor 22. The power supply 34 can be direct current (D.C.) power, alternate current (A.C.), or a combination of both.

The power tool 20 is further configured with a controller 32 for setting operational characteristics of the tool in response to instructions received from the computer 40. For example, torque conditions for the tool 20 are received by the computer and can be set by the controller 32. In another embodiment, when the angular velocity of the tool meets a threshold value, the controller can cut power to the motor 22. In yet another embodiment, where the tool 20 is an electro-static discharge device, the amount of static-electric charge to be discharged is received from the computer 40 and set by the controller 32.

As shown in the FIG. 1 example, the tool is configured with a sensor 30 that is in communication with the controller 32. The sensor 30 is used to sense operational characteristics associated with the tool. For example, tool location and orientation are sensed by the sensor 30 and relayed to the controller 32. In another embodiment, location and performance information of the tool 20 are relayed by the sensor 30 to the controller 32.

The sensor 30 is an analog multi-axis accelerometer that is used to measure the location and orientation of the power tool as the tool is being applied to a particular job task. Other types of sensors, such as angular speed sensors, digital accelerometers, laser ring gyroscopes, etc., are also within the scope of this disclosure. In addition, for different power tools, it is envisioned that the sensor 30 may be disposed in a different location than shown in FIG. 1 and/or configured to detect motion along one or more axis.

As shown in FIG. 1, the power tool 20 includes a transmit-receive device 33 that is in communication with the controller 32 and the computer 40. For example, in one exemplary embodiment, the transmit-receive device 33 is arranged to wirelessly transmit operational characteristics received by the controller 32 from the sensor 30 to the computer 40 and to receive instructions from the computer 40 concerning a next operation location for the power tool. The instructions are included in a graphical user interface that includes operating settings for the power tool 20, such as torque setting, discharge amount, and holding time.

The sensor 30 wirelessly transmits operational characteristics of the tool 20 to the computer 40. An example of the graphical user interface provided to the tool 20 from the computer 40 is discussed in connection with FIG. 3.

During tool 20 operation, operational characteristics, such as angular rotation, rotation rate, and static-electric discharge, are monitored by the controller 32 based on one or more signals received from the sensor 30. When the rotational rate of the tool 20 exceeds a threshold value received from the computer 40, this can indicate completion of a particular job task. For example, a certain number of rotations for a rotary driver or an amount or time of electrical discharge associated with operation of an ESD simulator can indicate that a certain task is complete. It will be appreciated by one skilled in the art that various sensor signals may be used to determine the completion of a particular task.

The task-design module 52 provides instructions to the power tool that contain choices an operator of the tool should make to accomplish a particular task with the tool 20. As shown in FIG. 1, the task-design module 52 is in communication with the task-design data store 56 that includes data for pre-defined tasks relating to complex systems. For example, in one embodiment, the task-design data store 56 includes all relevant part and task information associated with a designated repair procedure for aircraft maintenance. In another embodiment, the task-design data store 56 includes all relevant part and task information for assembling an aircraft. The task-design module 52 receives operational characteristics from the power tool 20 and can provide a next location for the power tool 20 to be utilized.

For example, a repair scenario for an aircraft can operate as follows. First, the aircraft is parked and chocked, and the power tool 20 is calibrated by placing the tool at one or more fixed positions on the airframe. The task-design module 52 then selects the designated repair procedure from the design data store 56, such as replacing a leading edge flap. The power tool 20 then indicates where to attach lifting rigs and which fasteners to remove, indicating the torque required for each on its display. After the flap is replaced, the task-design module 52 sets the desired torque on the tool 20 and indicates on the tool's display each location where a fastener is to be placed, recording the actual tool performance for each operation in the task-status data store 58. Advantageously, if one worker leaves at the end of a shift or on a break, the task-status data store 58 can be used to guide another worker to resume work on the next fastener. In addition, tracking tool performance, such as torque and revolutions per minute (RPM) can also detect a stripped screw or bolt that provides inadequate fastening. The system 10 can schedule remedial maintenance based on tool 20 performance. Further details of how the task-design module 52 receives the operational characteristics and provides a next location to the power tool are discussed below.

Figure 4A:
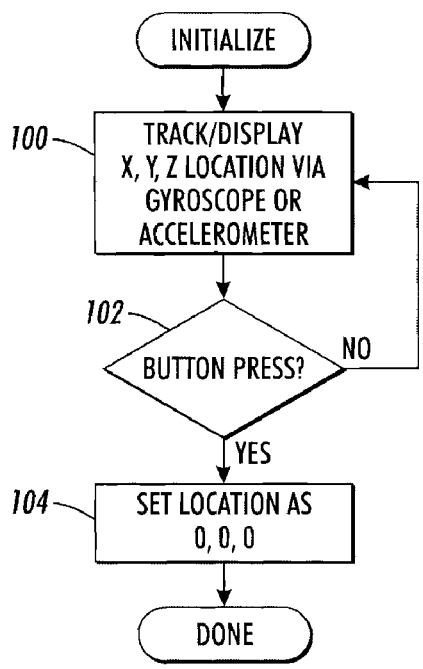
FIGS. 4A-C are flow charts of an example method to calibrate a power tool included in the system of FIG. 1.

An exemplary method for initializing and calibrating the power tool 20 executed by the task-design module 52 is described in connection with FIGS. 4A-C. As shown in FIG. 4A, to begin a task, the power tool's initial location is identified. Typically, this step includes positioning the power tool at a pre-defined start location for the particular task. As shown in FIG. 4A, the sensor can track and display X, Y, and Z coordinate positions 100 on the tool 20.

Upon the user of the tool 20 selecting the actuated switch 102, the controller 32 directs the transit-receive device 33 to transmit the initial location (0,0,0) to the task-design module 52. Upon the task-design module 52 receiving the initial location (0,0,0), the task-design module 52 relays the initial location information to the task-status module 54 which records the same in the task status data store 58. The task-design module 52 then provides a graphical user interface 90 to the power tool 20 to display operational tasks.

Figure 4B:
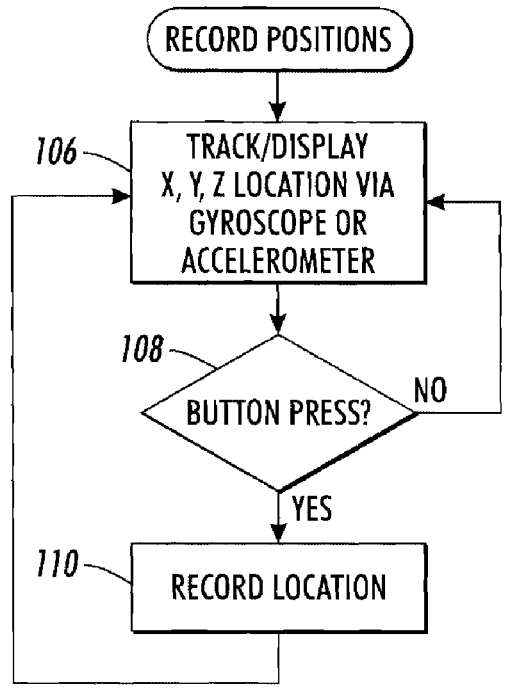
Figure 4C:
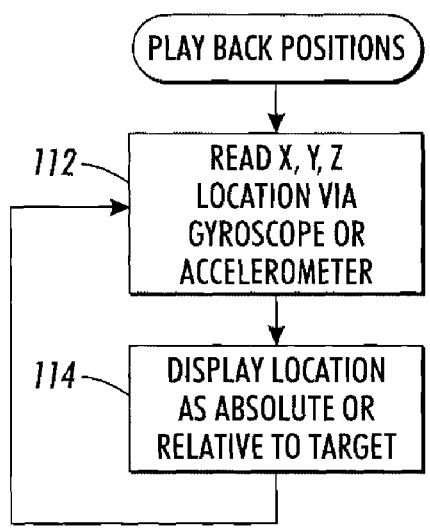

FIG. 4B illustrates a method of recording position locations associated with the tool 20. For example, as explained previously, the power tool includes a sensor 30 that tracks and displays location information 106 of the tool. Selection of the actuated switch results 108 in the controller 32 directing the transit-receive device 33 to transmit the current location (X,Y, Z) to the task-design module 52 which relays the same to the task-status module 54 for recordation 110 in the task status data store 58.

The method also can include providing playback positions. This feature is particularly advantageous to users of the tool that desire to know what tasks the tool was previously used on. As shown in FIG. 4C, for example, the task-design module 52 first accesses stored location coordinates 112 from the task-status data store 58 and then displays the location coordinates on the tool as absolute coordinates or relative to a particular target.

Figure 3:
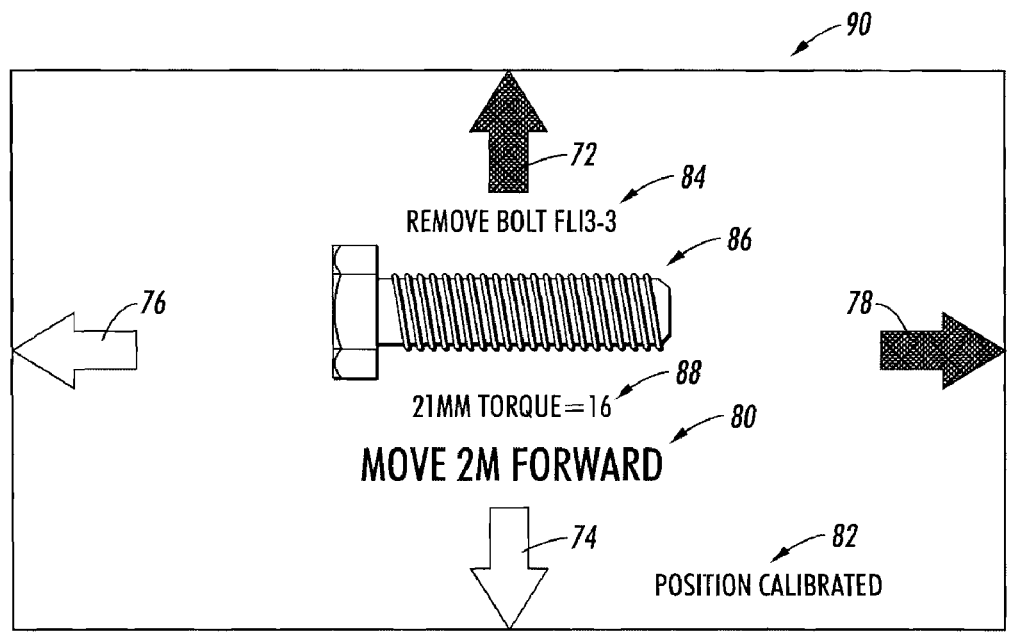
FIG. 3 illustrates an example of a graphical user interface to display operational tasks.

Turning now to FIG. 3, an example graphical user interface 90 provided by the task-design module 52 for display on a video display 38 of the power tool 20 is shown. The interface 90 includes directional indicators 72, 74, 76 and 78 that serve to direct a user of the device to position the tool 20 in a particular location, an instruction area 84 that is utilized to indicate an objective of the task, a graphics area 86 to illustrate a particular part or item that is the subject of the task, an operational settings area 88 that displays operational characteristics that are to be applied to the tool for a particular task, a display area 80 that can provide interactive instruction to the user concerning use of the tool 20, and a status area 82 that is utilized to indicate whether the tool is position calibrated.

The task-status module 54 monitors and tracks power tool 20 utilization and performance and is in communication with the task-status data store 58 to record current status of tasks completed, in progress, and to be completed. The task-status module 54 can provide a graphical user interface 50 that illustrates task status.

Figure 2:
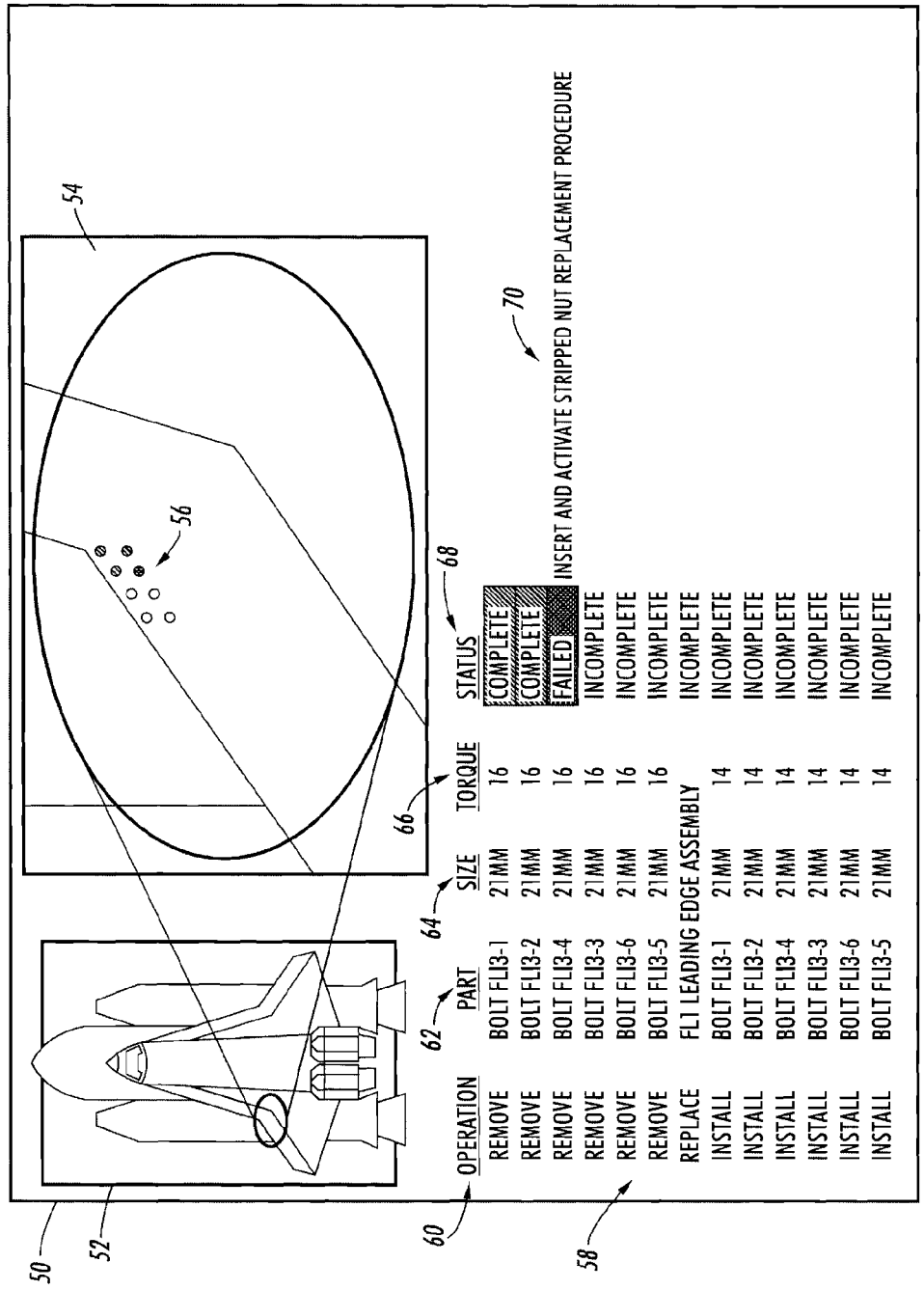
FIG. 2 illustrates an example of a graphical user interface to display operational task status.

For example, referring now to FIG. 2, an example graphical user interface 50 provided by the task-status module 54 is shown. The user interface 50 is displayed on a display device operatively coupled to the computer 40. For example, in one embodiment, the interface 50 is displayed on a computer monitor attached to the computer 40. In another embodiment, the interface 50 is displayed on a remote display device operatively coupled to the computer 40. It will be appreciated by one skilled in the art that some repair procedures may not require a precise sequence and can be processed by the present system. In addition, it will be appreciated by one skilled in the art that the present teaching of the disclosure can be applied to various tasks. For example, the present system can be utilized to provide an indication of a fastener requiring remediation, such as replacing a stripped nut and/or bolt.

The interface 50 includes a graphic over-view area 52 that illustrates a selected complex system to be worked upon with the tool 20 and a graphic detail-view 54 that illustrates a particular area or subassembly of the complex system that is to be worked upon by the tool 20. In one embodiment, detail components 56 of the subassembly can also be illustrated with status graphically. For example, as shown in FIG. 2, four (4) of the bolts depicted have clear centers indicating that they need to be worked upon by the tool, three (3) of the bolts have shaded centers indicating that they have already been worked upon, and one (1) bolt has a blackened center indicating that it is next bolt to be worked upon.

As shown in FIG. 2, the graphical user interface 50 also includes a detail area 58 arranged in the form of a matrix that includes an operation column 60 to indicate the type of operation that is to be performed with the tool, a part column 62 that indicates a component item that is to be worked upon by the tool, a physical characteristic 64 of the component 62, an operational characteristic 66 of the component that is to be set on the tool, and a status column 68 indicating whether or not the operation task for the component is completed or not completed. Status indicators in the status column 68 are color coded to facilitate reading of the matrix 58.

It will be appreciated that various of the above-disclosed and other features and functions, or alternative thereof, may be desirably combined into many other different systems or applications. For example, in one embodiment, the power tool operates as a stand-alone tool wherein the operational instructions are downloaded from the computer to the tool prior to initiating the task. Memory of the tool stores the operational instructions locally. The tool executes the locally stored operational instructions in response to receiving operational characteristics from the tool sensor.

Upon completion of the task, the tool uploads to the computer operational characteristics associated with the tool being applied to the task. For example, in one embodiment, task results of applying the tool to the task are uploaded to the computer. Typically, the power tool includes a communication port that allows the tool to receive the operational instructions and send operational characteristics to the computer. The communication port can be a serial port, a Universal Serial Bus (USB) port, or a wireless transmitter/receiver port.

It will be appreciated that various presently unforeseen or unanticipated alternatives, modifications, variations, or improvements therein may be subsequently made by those skilled in the art which are also intended to be encompassed by the following claims. In addition, the claims can encompass embodiments in hardware, software, or a combination thereof.

What is claimed is:

1. A system for reliable assembly and maintenance of complex systems comprising:
    a network;
    a power tool operatively coupled to said network, said power tool comprising a sensor to sense operational characteristics associated with said tool being applied to a procedure, said operational characteristics comprising tool location and tool performance information, said tool location being calibrated by placing said power tool at a predetermined location with respect to a complex system and identifying a procedure to be performed by said power tool on the complex system; and
    a computer operatively coupled to said network, said computer arranged to provide an operation instruction to the power tool in response to receiving said operational characteristics and the procedure to be performed.

2. The system of claim 1, wherein said sensor is at least one of a single axis accelerometer, a multiple axis accelerometer, an analog accelerometer, a digital accelerometer, a rotational speed sensor, an angular speed sensor, and a laser ring gyroscope.

3. The system of claim 2, wherein said sensor is wireless.

4. The system of claim 1, wherein said network is a wireless network selected from the group consisting essentially of a 802.11-compliant network, Bluetooth network, cellular digital packet data (CDPD) network, high speed circuit switched data (HSCSD) network, packet data cellular (PDC-P) network, general packet radio service (GPRS) network, 1x radio transmission technology (1xRTT) network, IrDA network, multichannel multipoint distribution service (MMDS) network, local multipoint distribution service (LMDS) network, and worldwide interoperability for microwave access (WiMAX) network.

5. The system of claim 1, wherein said operation instruction comprises an operation location for said power tool, said operation location corresponding to a location for performing the procedure.

6. The system of claim 1, wherein said power tool comprises a display to display an operation instruction for said tool.

7. The system of claim 6, wherein said operation instruction comprises tool setting information for said tool.

8. The system of claim 1, wherein said computer provides a user interface to display a status associated with said tool.

9. The system of claim 8, wherein said computer stores said status in a task status data store.

10. The system of claim 1, wherein said computer determines said operation instruction from a task design data store.

11. The system of claim 1, wherein said computer provides said operation instruction on a display device associated with said power tool.

* * * * *